June 28, 1938.    F. J. MACHOVEC    2,122,040

STEP

Filed Oct. 10, 1936

INVENTOR.
FRED J. MACHOVEC
BY George B. White
ATTORNEY.

Patented June 28, 1938

2,122,040

UNITED STATES PATENT OFFICE 2,122,040

STEP

Fred J. Machovec, Monterey, Calif.

Application October 10, 1936, Serial No. 105,024

7 Claims. (Cl. 280—166)

This invention relates to steps and particularly to a step for automobile house trailers or the like adapted to be folded into an out of way position when not in use.

An object of the invention is to provide a step for vehicles, such as automobile house trailers, wherein the step is held fast both in its extended and in its inoperative positions, and which can be quickly and easily moved into and out of operative position below the door opening of said vehicle.

Another object of the invention is to provide a foldable or collapsible support for a step which can be attached conveniently below the door opening of a vehicle, and which can be easily manipulated and positively held both in operative and inoperative positions without the use of clamps or clasps or the like, and in which the weight on the step assists in holding it still more firmly unfolded.

Another object of this invention is to provide a step for vehicles, such as trailers and the like which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawing.

With the foregoing and other objects in view, which will be made manifest in the following detailed description and specifically pointed out in the appended claims, reference is had to the accompanying drawing for the illustrative embodiment of the invention, wherein:

Figure 1:
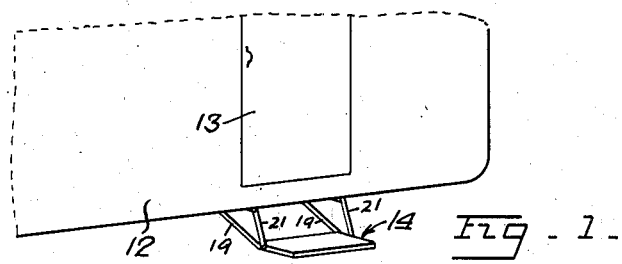
Figure 1 is a fragmental perspective view of a house trailer showing my step in operative position.

In carrying out my invention I make use of a frame, made of spaced frame members, such as a pair of spaced angle bars 9 attached to the underside of a floor board 11 or the like bottom member of a vehicle and particularly of an automobile house trailer 12. The frame is located near a side of the trailer and directly below the opening of the usual door 13. The frame is fixed relatively to the trailer 12 and is concealed beneath its floor.

A tread 14 is made of a board 16 covered at the top by a sheet of rubber 17 and held together by a marginal, flanged metal frame 18. From each side of the tread 14 extends an upwardly inclined, rigid, fixed arm 19. A rocking link 21 is pivoted to each bar 9 near the outer end of the latter so as to extend downwardly and rock in a substantially vertical plane. The upper end of each link 21 is pivoted at 22 to the adjacent bar 9 and the lower end of each link 21 is pivoted to the outside of the tread 14 at a fulcrum 23 near to but spaced from the inner edge of said tread 14. There is a rocking link 21 on each side of the tread 14.

Figure 2:
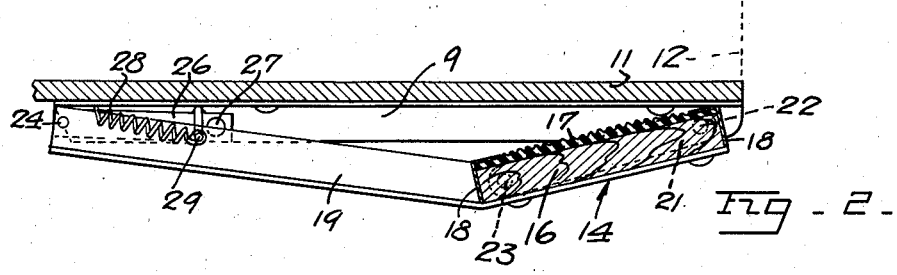
Figure 2 is a sectional view, showing the step collapsed or folded under its frame in an out of way position.
Figure 3:
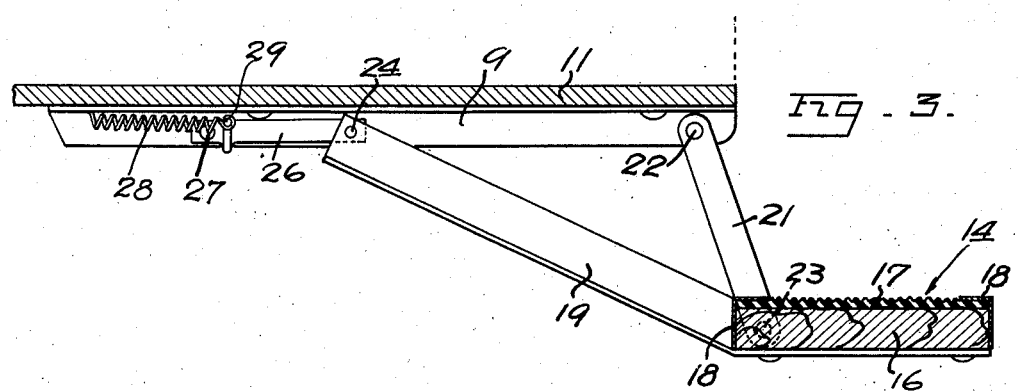
Figure 3 is a sectional view, showing the step in extended operative position.

The free end of each arm 19 is pivoted at 24 to the free end of a guide link 26 which latter is pivoted near its other end at 27 to the vertical flange of the adjacent bar 9 so that each guide link 26 rocks in a plane parallel with the plane of the vertical flange of the bar 9 and with the plane of rocking of the links 21. Each guide link 26 is capable of turning around its pivot 27 on a half circle turn below the frame so that it may project toward or away from the door 13 in its opposite positions. As the guide links 26 rock from one extreme position to the other the pivoted ends of the arms 19 are caused to move on an arcuate path and the arms 19 and the tread 14 are moved as a unit either inwardly and upwardly into the concealed position shown in Figure 2, or outwardly and downwardly into operative position as shown in Figure 3.

Figures 4, 5:
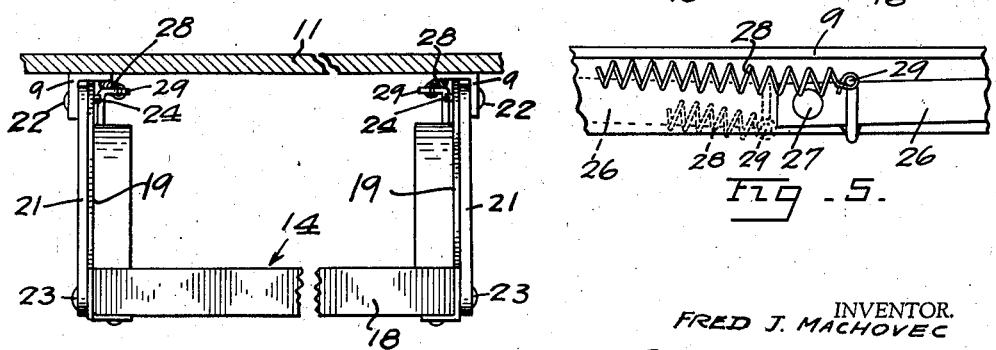
Figure 4 is a front view of the extended step.
Figure 5 is a fragmental view of my device showing the rocking link and its spring.

In order to avoid the necessity of pulling or pushing the tread 14 through its full movement, and in order to prevent accidental folding or unfolding, a coil spring is provided on each bar 9. Each coil spring 28 extends in substantial parallelism with the adjacent link 26 and in a direction away from the door 13. The inner end, namely the end of each spring 28 farthest from the door 13, is fixedly secured to the adjacent bar 9 and the outer end of each spring 28 is hooked on a bracket 29 which latter is so fixed on the link 26 that its spring holding point is between the pivot 27 and the free end of the link 26 and is offset to one side of the center line of the pivot 27. The offset of the point of the bracket 29 is such that in the concealed or collapsed position of the step the point of the bracket 29 is below the pivotal center line of the link 26, and in the operative or unfolded position of the step the point of the bracket 29 is above said pivotal center line. Consequently after the link 26 is initially turned past its vertical position in either direction the coil spring 28 urges and automatically snaps the link 26 to the complete end of its turn in the respective directions and tends to hold it fast there against the frame. The relative positions of the bracket 29 are shown in detail in Figure 5, wherein the position when the step is unfolded is shown in full lines, and the position when the step is concealed is shown in broken lines.

In operation the entire unit is attached underneath the floor of the trailer and in alignment with the door so that the frame is entirely concealed. The tread 14 and the arms 19 act as a rigid unit. It is to be noted that the upper corners of the arms 19 abut against the frame members, also that the pivots 24 in this folded position are slightly above the pivots 27 so that the links 26 are in compression and are further prevented from turning by the springs 28. Thus the entire unit is held in its concealed position without any rattle and without any danger of accidental unfolding or dropping.

In order to move the tread 14 into operative position it is merely necessary to reach inside under the tread 14 and pull its inner edge, namely the edge farthest from the door 13, downwardly thus the ends of the guide link 26 are turned below the pivots 27 against the action of the springs 28 and the entire unit moves downwardly and away from frame toward the outside. After the links 26 are moved past substantially a quarter circle turn the springs 28 snap the same outwardly and upwardly thereby moving the arms 19 toward the outside. The rocking links 21 cause the fulcrum 23 to shift downwardly and outwardly away from the frame until the tread 14 projects beyond the side of the trailer below the door 13 as shown in Figures 1 and 3. In this operative or extended position any weight on the tread 14 exerts a downward force and the lever action around the fulcrums 23 transmits an upward force to the free ends of the arms 19, which in turn firmly abut against the underside of the frame. Any lateral force on the outer edge of the tread 14 is also resisted by the links 26. Thus the step is held fast in its operative position.

In order to again fold the step into concealed position it is necessary to apply an upward and inward push to the lower, outer edge of the tread 14. Such directed force, preferably applied by the foot, turns the so-called lever around the fulcrum 23 so as to move the ends of the arms 19 downwardly and on an arc inwardly as the links 26 turn around their pivots 27. After passing the vertical position around the pivots 27 the springs 28 snap the entire unit into the folded, concealed position. During this folding movement the rocking or spacing links 21 also swing and the fulcrum 23 is shifted inwardly and upwardly.

The step heretofore described is easily attached in place and while it is self locked in its extreme concealed and extended positions yet it can be folded or unfolded with the exertion of very slight directional force. The device is simple in structure, it does not require any adjustment or any tying or clamping in its various positions yet its accidental folding or unfolding is prevented.

Having thus described my invention what I now claim and desire to secure by Letters Patent is:

1. In a foldable step, the combination with a frame secured on a vehicle, of a tread, a pair of rocking links extended from the frame downwardly and being pivotally connected to the opposite sides of the tread to provide a shiftable fulcrum therefor, a fixed arm on each side of the tread being extended upwardly substantially from the fulcrum of said tread, another pair of spaced links on the frame adapted for substantially a half circle rocking and being pivotally connected to the respective arms, and a spring to urge each of said second links toward the frame when said second links are moved past substantially a quarter turn in either direction.

2. In a step of the character described, the combination with frame members, of a support element, a tread formed on the outside end of the element, the inner portion of said element being arranged at an obtuse angle from the inner end of the tread toward the frame, a rocking fulcrum substantially at the meeting line of said tread and said obtuse inner portion, and rocking means pivotally connected to the inner end of the obtuse inner portion to guide said end into abutting relation to said frame on either side of the pivot of the rocking support.

3. In a step of the character described, a frame, a lever, a tread formed on the outer portion of said lever, the inner portion of said lever being extended upwardly toward the frame, a shiftable fulcrum for said lever so arranged that weight on the top of the tread in operative position pushes the inner end of the lever against the frame, and a substantially upwardly exerted force on the outer portion of the lever moves the inner end of the lever away from the frame, means of connection between the inner end of the tread and said frame to cause said lever to move from its operative position inwardly toward the frame when said upward force is exerted and to move from its folded position outwardly and away from said frame when a downward force is exerted on the inner portion of the tread, and means to urge the inner end of the lever against the frame in the folded position of the tread.

4. In a step of the character described, a frame, a lever, a tread formed on the outer portion of said lever, the inner portion of said lever being extended upwardly toward the frame, a shiftable fulcrum for said lever so arranged that weight on the top of the tread in operative position pushes the inner end of the lever toward the frame and a substantially upwardly exerted force on the outer portion of the lever moves the inner end of the lever away from the frame, and means of connection between the inner end of the lever and said frame to cause said tread and lever to move inwardly from said operative position toward the frame when said upward force is exerted and to move outwardly from the folded position and away from said frame when a downward force is exerted on the inner portion of the tread, and resilient yieldable means to urge said lever to complete its motion from full outward to full inward position and vice versa after a predetermined initial movement of the lever.

5. In a step of the character described, a frame, a lever connected to the frame by a shiftable fulcrum, an end of the lever in extended position extending beyond the fulcrum outside and beyond said frame and the other end of the lever extending upwardly, below and toward the frame so that weight rested on said outer end of the lever urges the inner end toward and against said frame, a tread formed on said outer end of the lever, and means of connection between the inner end of said tread from the extended position and the frame to urge the lever inwardly and upwardly toward the frame after an initial upward turning of the tread around said fulcrum, and to urge the lever outwardly and downwardly from its folded position after an initial outward pull and turning of said tread portion of the lever around said fulcrum.

6. In a step of the character described, a frame, a lever connected to the frame by a shiftable fulcrum, an end of the lever in extended position extending beyond the fulcrum outside and beyond said frame and the other end of the lever extending upwardly, below and toward the frame so that weight rested on said outer end of the lever urges the inner end toward and against said frame, a tread formed on said outer end of the lever, a rocking connection on the frame being pivotally connected to the inner end of the lever so as to guide the inner end of the lever outwardly or inwardly as the tread is pulled out from below or pushed in under the frame respectively, said shifting fulcrum being adapted to move downwardly away from the frame as the tread is pulled outwardly, and to move upwardly and toward the frame as the tread is pushed inwardly under the frame, and means to urge the inner end of the lever against said frame both in the outer and inner position of said lever.

7. In a foldable step, a horizontal support, a tread, rocking means extended from the support downwardly and being pivotally connected to the tread to provide a shiftable fulcrum therefor, a fixed arm on each side of the tread extending upwardly substantially from the fulcrum of said tread, a pair of spaced links pivoted on the support and adapted for substantially a half circle rocking movement, and being pivotally connected to the respective arms, and a spring to urge said links toward the support when they are moved past center in their pivotal movement in either direction.

FRED J. MACHOVEC.